United States Patent
Cobb

(10) Patent No.: US 11,816,828 B2
(45) Date of Patent: *Nov. 14, 2023

(54) METHOD FOR DETECTING ANOMALIES ON OR IN A SURFACE OF A STRUCTURE

(71) Applicant: Roof Asset Management USA, Ltd., Brunswick, OH (US)

(72) Inventor: Joseph C Cobb, Medina, OH (US)

(73) Assignee: Roof Asset Management USA, Ltd., Brunswick, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,325

(22) Filed: Feb. 16, 2023

(65) Prior Publication Data
US 2023/0196544 A1 Jun. 22, 2023

Related U.S. Application Data

(63) Continuation of application No. 17/110,890, filed on Dec. 3, 2020, now Pat. No. 11,587,220, which is a
(Continued)

(51) Int. Cl.
*G06T 7/00* (2017.01)
*G01J 5/02* (2022.01)
*G01J 5/00* (2022.01)

(52) U.S. Cl.
CPC ............. *G06T 7/0004* (2013.01); *G01J 5/02* (2013.01); *G01J 2005/0077* (2013.01);
(Continued)

(58) Field of Classification Search
None
See application file for complete search history.

(56) References Cited

U.S. PATENT DOCUMENTS

| 5,631,465 | A | * | 5/1997 | Shepard | ................. | G01N 25/72 |
| | | | | | | 250/330 |
| 8,094,883 | B2 | * | 1/2012 | Nagai | ................ | G06K 9/00597 |
| | | | | | | 382/103 |

(Continued)

*Primary Examiner* — Nancy Bitar
(74) *Attorney, Agent, or Firm* — Edwin A. Sisson, Attorney at Law, LLC; Jeffrey J. Banyas

(57) ABSTRACT

Described herein is a method of detecting anomalies on a surface of a structure. The method may comprise taking a thermal image of the surface of the structure. The method may further comprise taking a visual image of the surface of the structure. The method may then comprise conducting a thermal image numerical analysis on the thermal image. The thermal image numerical analysis may comprise obtaining a thermal image numerical value table. The thermal image numerical analysis may then comprise obtaining a surface nominal thermal value of the surface material. The thermal image numerical analysis may then comprise eliminating a first subset of pixels having a thermal value within a nominal thermal variation from the plurality of pixels. The thermal image numerical analysis may then comprise comparing the thermal value of each pixel of the plurality of pixels not in the first subset of pixels to the surface nominal thermal value to identify at least one anomaly. The thermal image numerical analysis method may then comprise removing a first number ($n_1$) of first anomalies from the thermal image numerical analysis. Finally, the method may comprise comparing the first anomalies from the thermal image numerical analysis to the visual image.

19 Claims, 3 Drawing Sheets

Related U.S. Application Data continuation of application No. 16/761,671, filed as application No. PCT/US2019/057343 on Oct. 22, 2019, now Pat. No. 10,872,404.

(60) Provisional application No. 62/751,441, filed on Oct. 26, 2018.

(52) U.S. Cl.
CPC .............. *G06T 2207/10024* (2013.01); *G06T 2207/10032* (2013.01); *G06T 2207/10048* (2013.01)

(56) References Cited

U.S. PATENT DOCUMENTS

| | | | |
|---|---|---|---|
| 8,407,616 B2* | 3/2013 | Bergstrom | G06T 11/206 |
| | | | 715/782 |
| 9,971,792 B2* | 5/2018 | Solli | G06K 9/3241 |
| 10,180,950 B2* | 1/2019 | Solli | G06F 16/583 |
| 10,375,325 B2* | 8/2019 | Schmidt | G06K 9/6212 |
| 2018/0239784 A1* | 8/2018 | Solli | G06K 9/3216 |

* cited by examiner

FIG. 2

METHOD FOR DETECTING ANOMALIES ON OR IN A SURFACE OF A STRUCTURE

CROSS REFERENCES AND PRIORITIES

This Application claims priority from International Application No. PCT/US2019/057343 filed on 22 Oct. 2019 and United States Provisional Application No. 62/751,441 filed on 26 Oct. 2018 the teachings of each of which are incorporated by reference herein in their entirety.

BACKGROUND

Many attempts have been made to detect and monitor the presence of certain anomalies, such as moisture or energy loss, on specific surfaces such as the roof of a building. One such method is disclosed in U.S. Pat. No. 6,104,298 which discloses a roof moisture detection assembly includes an imaging system for obtaining thermal and visible images of a roof surface, an imaging system support structure for mounting the imaging system in a position elevated relative to the roof surface, a reference target mounted on the roof surface, and an image-processing system adapted to compare current thermal and visible images of the roof surface with previous thermal and visible images of the roof surface and detect shapes and areas of anomalous features, and to compare the current thermal and visible images with each other and detect shapes and areas of anomalous features.

The known methods for detecting and monitoring anomalies on a surface, such as a roof, often suffer from an inability to distinguish anomalies of interest from anomalies which are not of interest. For instance, known methods may be incapable of distinguishing a moisture anomaly which is of interest and may call for repair or replacement of the surface, from an anomaly caused by a desirable structure on the surface such as a vent which is not of interest.

The need exists, therefore, for an improved method of detecting and monitoring the presence of anomalies on a surface which can eliminate anomalies which are not of interest.

SUMMARY

A method of detecting anomalies on a surface of a structure is disclosed. The method may comprise the steps of taking a thermal image of the surface of the structure, and conducting a thermal image numerical analysis on the thermal image.

The thermal image numerical analysis may comprise the steps of obtaining a thermal image numerical value table comprising a plurality of pixels, obtaining a surface nominal thermal value, eliminating a first subset of pixels from the plurality of pixels, comparing a thermal value of each pixel of the plurality of pixels not in the first subset of pixels to the surface nominal thermal value to identify at least one anomaly, and removing a first number ($n_1$) of first anomalies from the thermal image numerical value table. Each pixel of the plurality of pixels may have an X coordinate, a Y coordinate, and a Z coordinate with the X coordinate and the Y coordinate corresponding to a specific spatial location of the pixel on the surface of the structure, and the Z coordinate corresponding to a thermal value of said pixel. The thermal value may be a real number greater than or equal to 0. The first subset of pixels may have a thermal value which is within a nominal thermal variation of a surface material of the surface to the surface nominal thermal value. $n_1$ may be an integer greater than or equal to 0. The first anomalies may be selected from the group consisting of at least one non-delta anomaly, at least one non-signature anomaly, at least one non-pattern anomaly, at least one non-visual anomaly, and at least one non-cavity anomaly.

In some embodiments, the method may further comprise comparing the thermal value of a second number ($n_2$) of second anomalies from the thermal image numerical value table wherein $n_2$ is an integer greater than or equal to 0 to the surface nominal thermal value in order to identify a type of anomaly selected from the group consisting of an energy loss anomaly, and a live load anomaly.

In some embodiments, the thermal image may be taken at least 60 minutes after sunset on a sunny day. In some embodiments, the thermal image may be taken at a time selected from the group consisting of no more than about 6 hours after sunset, no more than about 5 hours after sunset, no more than about 4 hours after sunset, no more than about 3 hours after sunset, and no more than about 2 hours after sunset.

In some embodiments, the thermal image may be taken on a day in which a geographic location of the surface experiences no more than about 40% cloud cover during at least the 4 hours preceding sunset. In other embodiments, the thermal image may be taken on a day in which a geographic location of the surface experiences no more than about 30% cloud cover during at least the 4 hours preceding sunset. In still other embodiments, the thermal image may be taken on a day in which a geographic location of the surface experiences no more than about 20% cloud cover during at least the 4 hours preceding sunset. In still other embodiments, the thermal image may be taken on a day in which a geographic location of the surface experiences no more than about 10% cloud cover during at least the 4 hours preceding sunset.

In some embodiments the method may further comprise the steps of: taking a visual image of the surface of the structure; and comparing the first anomalies from the thermal image numerical analysis to the visual image. The visual image may be taken at or around solar noon on the same day as the thermal image.

In some embodiments, obtaining the surface nominal thermal value may comprise calculating the most prevalent thermal value across a second subset of the pixels. In some embodiments, the second subset of the plurality of pixels may comprise a percentage of total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

In some embodiments, the step of comparing a thermal value of each pixel of the plurality of pixels to the surface nominal thermal value may yield an intensity value for each thermal value corresponding to each individual pixel calculated according to a formula:

$$(MTV)-(NTV)=IV$$

where MTV is the thermal value of each pixel and NTV is the surface nominal thermal value. In some embodiments, the intensity value may be calculated for each pixel of the plurality of pixels which make up the thermal image numerical value table. In other embodiments, the intensity value may be calculated for a third subset of the plurality of pixels comprising a percentage of the total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

In some embodiments, the intensity value of each pixel of the plurality of pixels may be plotted on a three dimensional graph.

A method of detecting lighting anomalies on a surface of a structure is also disclosed. The method may comprise the steps of: taking a visual image of the surface of the structure; performing a black and white color adjustment on the visual image; calculating a light intensity of a plurality of pixels within the visual image; identifying a first subset of the plurality of pixels; identifying a second subset of the plurality of pixels; performing a black color adjustment on the second subset of the plurality of pixels; identifying a third subset of the plurality of pixels; and performing a gradation color adjustment on the third subset of the plurality of pixels.

The visual image of the surface of the structure may be taken in color. Each pixel within the first subset of the plurality of pixels may correspond to a threshold light intensity. In some embodiments, the light intensity of each pixel within the second subset of the plurality of pixels may be below the threshold light intensity. In certain embodiments, the light intensity of each pixel within the third subset of the plurality of pixels may be above the threshold light intensity.

In some embodiments, the visual image may be taken at a time which is no greater than 60 minutes after sunset and no less than 60 minutes before sunrise. The visual image may be taken by an optical camera mounted to an aircraft flying over the surface. The aircraft may be traveling at a speed in the range of between 0 mph and 150 mph. The optical camera may have a shutter speed in the range of between 1/400 seconds and 1/10,000 seconds.

BRIEF DESCRIPTION OF FIGURES

FIG. 2 is one embodiment of a thermal image numerical value table as described herein.

DETAILED DESCRIPTION

Disclosed herein is a method of detecting anomalies on the surface of a structure. The method may include the following steps. The first step may comprise taking a thermal image of the surface of the structure. The next step may comprise taking a visual image of the surface of the structure. The next step may comprise conducting a thermal image numerical analysis on the thermal image to obtain a thermal image numerical value table. The next step may comprise obtaining a surface nominal thermal value (also known as a Nominal Temperature Value (NTV)). The next step may comprise comparing one or more of the thermal values (also known as Measured Temperature Value (MTV)) of the thermal image numerical value table to the surface nominal thermal value to identify at least one anomaly. The next step may comprise removing a first number ($n_1$) of first anomalies from the thermal image numerical analysis, the first anomalies each being a type of anomaly which is not of interest. The next step may comprise comparing the thermal value of a second number ($n_2$) of second anomalies from the thermal image numerical analysis, the second anomalies each being a type of anomaly which is of interest.

Figure 1:
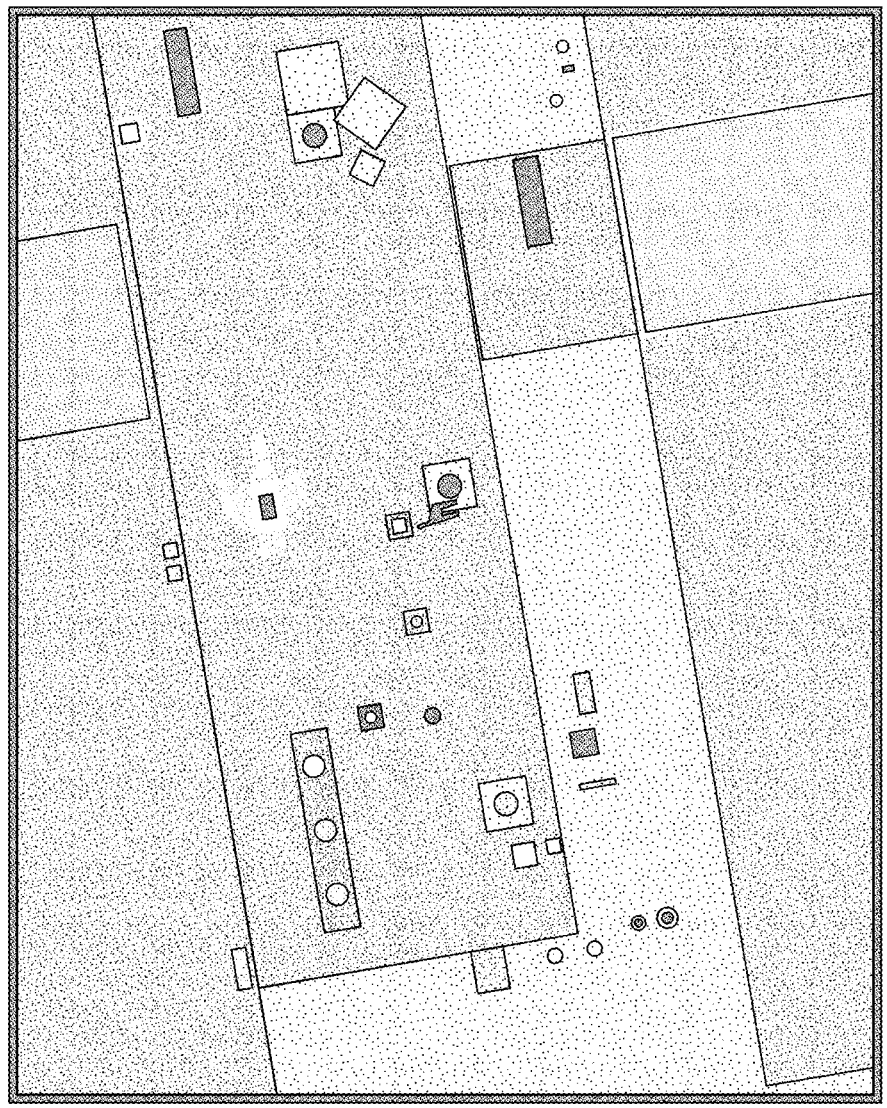
FIG. 1 is one embodiment of a thermal image as described herein.

The step of taking a thermal image of the surface of the structure may comprise flying over the surface using an airplane, helicopter, drone, or similar aerial vehicle. The aerial vehicle may include an infrared camera facing downwardly from the aerial vehicle towards the ground. Preferably the infrared camera is oriented towards the ground in a nadir position. One example of an infrared camera is an SC-8313 camera available from FLIR® Systems, Inc. of Wilsonville, Oregon, U.S.A. Preferably the infrared camera has a resolution of at least 320×240 with at least 640×480 being more preferred and at least 1024×1024 being most preferred. One example of a thermal image—which is a thermal image of a roof surface—is shown in FIG. 1.

Preferably, the thermal image is taken at least 60 minutes after sunset on a sunny day. More preferably the thermal image is taken at a time selected from the group consisting of no more than about 6 hours after sunset, no more than about 5 hours after sunset, no more than about 4 hours after sunset, no more than about 3 hours after sunset, and no more than about 2 hours after sunset. By sunny day it is meant that the geographic location where the surface is located experienced no more than about 40% cloud cover during at least the 4 hour preceding sunset with no more than about 30% cloud cover during at least the 4 hours preceding sunset being more preferred, no more than about 20% cloud cover during at least the 4 hours preceding sunset being still more preferred, and no more than about 10% cloud cover during at least the 4 hours preceding sunset being most preferred. Taking the thermal image at or after the time of sunset on a sunny day better ensures that the surface has been exposed to thermal radiation during daytime hours which can be detected in the thermal image while also reducing or eliminating interference in the thermal image caused by thermal radiation from the sun.

Corresponding to a sunny day—it is preferred that the thermal image be taken on a day having specific environmental conditions related to precipitation and wind speeds. Regarding precipitation, it is preferred that the thermal image be taken at a time in which there has been no precipitation during the preceding 12 hours with no precipitation during the preceding 18 hours being more preferred, no precipitation during the preceding 24 hours being still more preferred, no precipitation during the preceding 36 hours being even more preferred, and no precipitation during the preceding 48 hours being most preferred. Regarding wind speed, it is preferred that the thermal image be taken at a time in which the sustained wind speed is below 20 mph with sustained wind speed below 15 mph being more preferred, sustained wind speed below 10 mph being still more preferred, and sustained wind speed below 5 mph being most preferred.

Preferably, the thermal image is taken before a dew point convergence time which is the time at which the ambient temperature exterior to the surface is equal to the dew point exterior to the surface. More preferably, the thermal image is taken at a time when the ambient temperature is at least about 0.5° F. above the dew point. Even more preferably, the thermal image is taken at a time when the ambient temperature is at least about 1.0° F. above the dew point. Most preferably, the thermal image is taken at a time when the ambient temperature is at least about 2.0° F. above the dew point. Accordingly, the time for taking the thermal image may be represented as a thermal image time window beginning at a first time and ending at a second time. The first time may be selected from the group consisting of no more than about 6 hours after sunset, no more than about 5 hours after sunset, no more than about 4 hours after sunset, no more than about 3 hours after sunset, and no more than about 2 hours after sunset. The second time may be selected from the group consisting of the dew point convergence time, a time when the ambient temperature is at least about 0.5° F. above the dew point, a time when the ambient temperature is at least about 1.0° F. above the dew point, and a time when the ambient temperature is at least about 2.0° F. above the dew point.

It is known that factors such as humidity and distance from the surface may affect the output of the thermal image. Infrared cameras typically allow for inputs of the measured humidity and distance from surface. Humidity may be measured as either absolute humidity, relative humidity, or specific humidity using a psychrometer or hygrometer and input into the infrared camera. Preferably, the humidity input to the infrared camera is relative humidity. Distance from the surface may be measured in standard or metric units using an altimeter and input into the infrared camera.

The step of taking a visual image of the surface of the structure may also comprise flying over the surface using an airplane, helicopter, drone, or similar aerial vehicle. The aerial vehicle may include an optical camera facing downwardly from the aerial vehicle towards the ground. Preferably the optical camera is oriented towards the ground in a nadir position. One example of an optical camera is a Cannon 5D Series camera available from Canon Inc. of Ota, Tokyo, Japan. Preferably the optical camera has a resolution of at least 10 megapixels with at least 20 megapixels being more preferred.

The time of day that the visual image is taken is not considered important. In fact, the visual image does not even have to be taken on the same day as the thermal image. Preferably, the visual image is taken at or around solar noon on the same day as the thermal image. At or around solar noon refers to the period beginning at least 15 minutes before solar noon and ending no more than 15 minutes after solar noon. By solar noon it is meant the time at which the sun crosses the local meridian at the specific geographic location of the structure and reaches its highest position in the sky, except at the poles.

Figure 2:
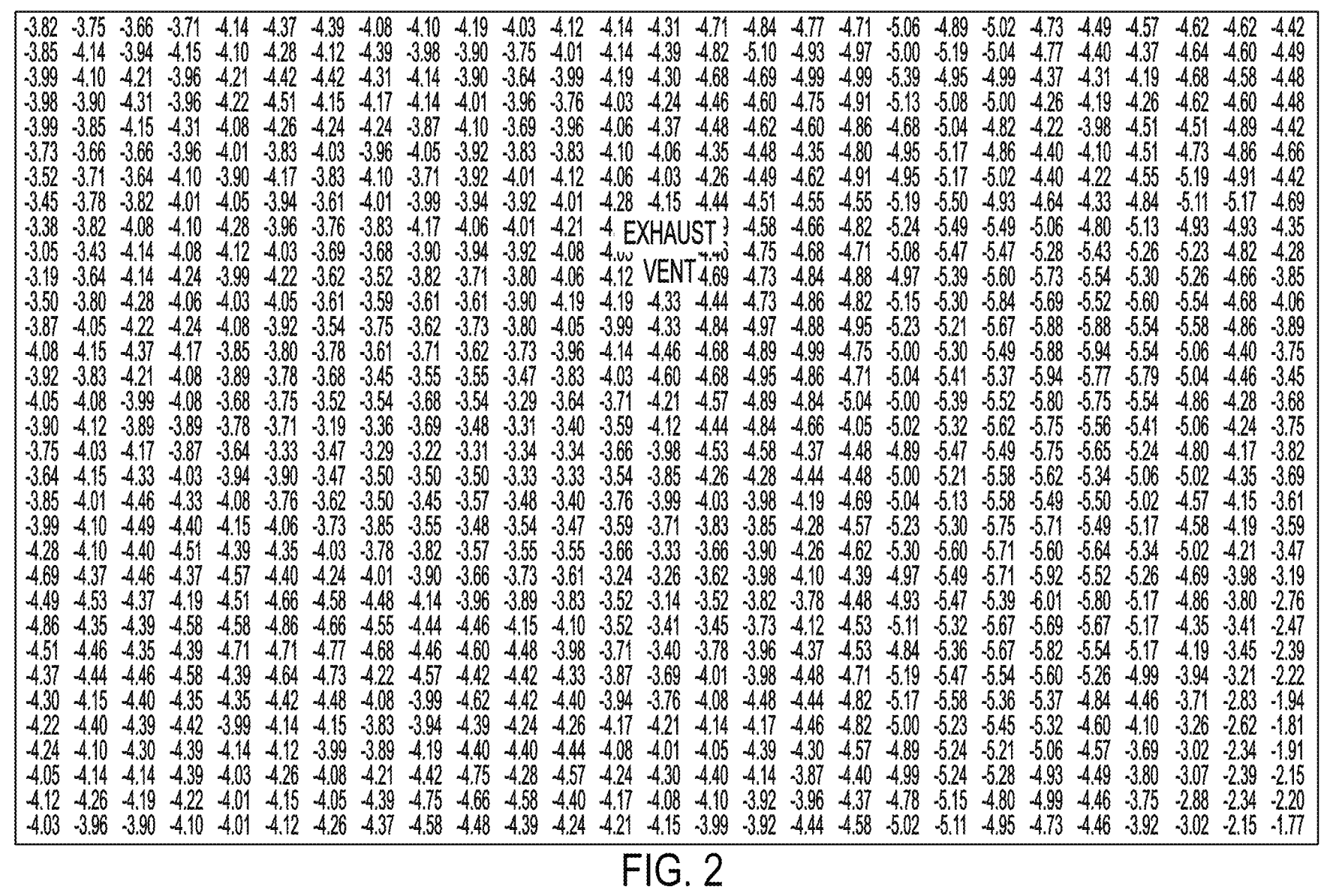

The step of conducting a thermal image numerical analysis on the thermal image to obtain a thermal image numerical value table may comprise converting the thermal image into a plurality of pixels with each pixel having an X coordinate and a Y coordinate. Each X coordinate and Y coordinate may represent a specific position (i.e.—latitude and longitude) on the surface. One example of a thermal image numerical value table is shown in FIG. 2 which is a thermal image numerical value table corresponding to the thermal image shown in FIG. 1.

It is well known that the number of pixels and pixel size will depend, at least in part, on the resolution of the infrared camera used to obtain the thermal image and the distance from the surface from which the thermal image is taken. For instance, an infrared camera having a resolution of 320×240 taking a thermal image at a distance from the surface of 50 feet may produce an image having 76,800 pixels with a pixel size of 0.719×0.720 inches per pixel.

Each pixel may also have a Z coordinate. The Z coordinate may correspond to a thermal value of the pixel. It is well known that the thermal value is a measurement of the infrared energy (heat) transmitted from the surface and converted into an electronic signal by the infrared camera. The thermal value will be a real number greater than or equal to 0.

In some embodiments, the step of obtaining a surface nominal thermal value may comprise calculating the most prevalent thermal value (corresponding to the Z coordinate) across a subset of the pixels. The subset of pixels may comprise a percentage of the total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

Once the surface nominal thermal value has been determined, a first subset of pixels from the plurality of pixels may be eliminated. This first subset of pixels may have a thermal value which is within a nominal thermal variation of a surface material of the surface to the surface nominal thermal value. For instance, for some surface materials, the nominal thermal variation of the surface material may be +/−1° F. of the surface nominal thermal value. The surface nominal thermal variation will vary depending on the type of surface material. This first subset of pixels are indicative of areas of the surface which do not require remediation efforts as their thermal value does not significantly deviate from the nominal thermal value. In some embodiments, the surface nominal thermal variation may require a surface nominal thermal variation adjustment based on environmental factors such as ambient temperature or internal structure temperature. For instance, the surface nominal thermal variation may be adjusted upwards by between 1% and 500% based on increases to the ambient temperature surrounding the exterior of the surface or the temperature inside the structure which the surface covers.

Comparing one or more of the thermal values of the thermal image numerical value table to the surface nominal thermal value (NTV) to identify at least one anomaly will yield an intensity value (IV) for each thermal value (MTV) corresponding to each individual pixel upon which the comparison is run. The intensity value (IV) of each individual pixel is calculated according to Formula A:

$$(MTV)-(NTV)=IV \quad \text{Formula A}$$

It is preferred, but not necessary, that the intensity value is calculated for each pixel of the plurality of pixels not in the first subset of pixels eliminated based on their deviation from the nominal thermal variation. In some embodiments, the intensity value may be calculated for a second subset of the plurality of pixels. The second subset of the plurality of pixel may comprise a percentage of the total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

Figure 3:
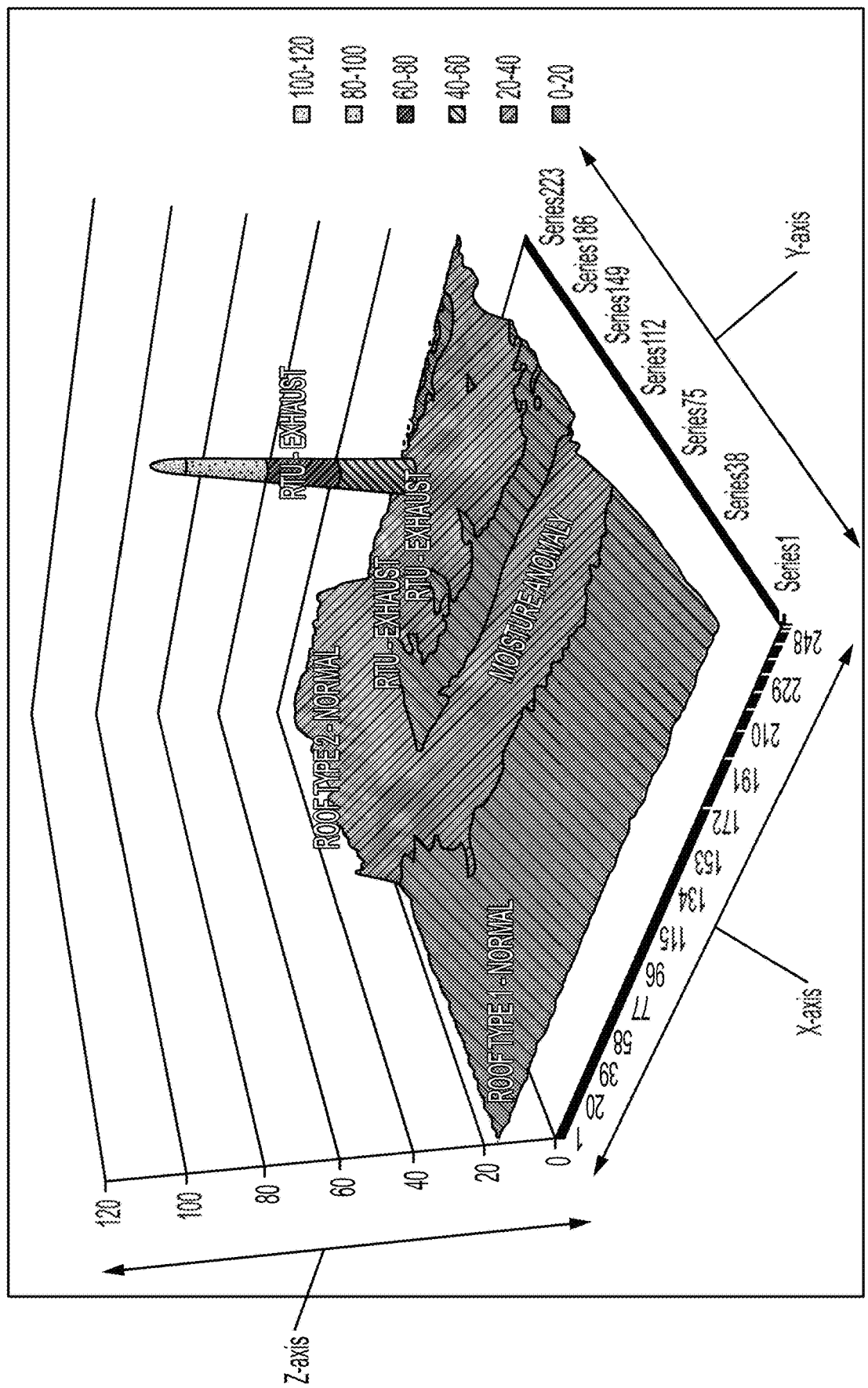
FIG. 3 is one embodiment of a three dimensional graph of intensity values as described herein.

The intensity values may be plotted on a three dimensional graph of intensity values. One example of such three dimensional graph is shown in FIG. 3, which shows the three dimensional graph of intensity values for the surface of a roof from FIG. 1 with the Z axis representing the intensity value which is a real number in the range of between 0 and 120 calculated according to Formula A, and the X axis and Y axis corresponding to the dimensions of the surface.

Once the intensity values are known they may be used to distinguish one or more anomalies. Anomalies may be identified based on the minimum to maximum rise above the nominal thermal value for the particular material which makes up the surface. By way of example, but not limitation, where the surface is a roof and the material is a polyisocyanurate, the minimum rise above nominal thermal value is +2.5° F. while the maximum rise above nominal thermal value is +30° F. Accordingly, if the nominal thermal value of a polyisocyanurate roof is determined to be 77° F., a particular pixel would qualify as an anomaly if its thermal value is less than 79.5° F. or greater than 107° F.

In some embodiments, the maximum rise above nominal thermal value for the particular material may require a first adjustment due to the effects of increased daytime high temperature on the material. Said first adjustment may include the addition of 0.65° F. to the maximum rise above nominal thermal value for every degree Fahrenheit that the daytime high temperature is above 78° F. to obtain a first adjusted maximum rise above nominal thermal value. By way of example, but not limitation, where the surface is a polyisocyanurate roof, and the measured local daytime high temperature is 105° F., the maximum rise above nominal thermal value should be increased by 17.55° F., making the first adjusted maximum rise above nominal thermal value for the polyisocyanurate roof +47.55° F. Accordingly, in the example listed above where the surface is a polyisocyanurate roof and the nominal thermal value is determined to be 77° F., a particular pixel would qualify as an anomaly if its thermal value is less than 79.5° F. or greater than 124.55° F.

In some embodiments, the maximum rise above nominal thermal value for the particular material may require a second adjustment due to the effects of dew point to obtain a second adjusted maximum rise above nominal thermal value. Said second adjustment may include determining an estimated time remaining in the thermal image time window at the actual time of taking the thermal image. For instance, if the thermal image time window is set to open at 8:00 pm and close at 11:15 pm (based on forecasted temperature and dew point used to calculate the second time at which the thermal image time window closes according to the method described herein), then the thermal image time window is scheduled to last 195 minutes. If the thermal image actual time (the time at which the thermal image was actually taken) is 9:30 pm, then the thermal image was taken with 54.8% of the thermal image time window remaining. The first adjusted maximum rise above nominal thermal value is then multiplied by the percent of thermal image time window remaining to determine the second adjusted maximum rise above nominal thermal value. In the example above where the surface is a polyisocyanurate roof and the first adjusted maximum rise above nominal thermal value was determined to be +47.55° F., if the percentage of thermal image time window remaining is 54.8% as calculated above, then the second adjusted maximum rise above nominal thermal value is +26.1° F. Accordingly, in the example listed above where the surface is a polyisocyanurate roof and the nominal thermal value is determined to be 77° F., a particular pixel would qualify as an anomaly if its thermal value is less than 79.5° F. or greater than 103.1° F.

In some embodiments, the effect of wind velocity at the actual time that the thermal image is taken may result in an adjustment to the thermal image time window for purposes of calculating the second adjusted maximum rise above nominal thermal value. In the event that wind velocity at the actual time that the thermal image is taken is in a range of 5 knots to 9 knots, then the first time of the thermal image time window may be adjusted by −10 minutes (i.e.—the thermal image time window opens 10 minutes earlier) while the second time of the thermal image time window may be adjusted by −15 minutes (i.e.—the thermal image time window closes 15 minutes earlier) for purposes of calculating the second adjusted maximum rise above nominal thermal value. In the event that wind velocity at the actual time that the thermal image is taken is in a range of 10 knots to 15 knots, then the first time of the thermal image time window may be adjusted by −20 minutes (i.e.—the thermal image time window opens 20 minutes earlier) while the second time of the thermal image time window may be adjusted by −30 minutes (i.e.—the thermal image time window closes 30 minutes earlier) for purposes of calculating the second adjusted maximum rise above nominal thermal value.

The intensity values may be used to remove at least a first number ($n_1$) of first anomalies from the thermal image numerical analysis. The first anomalies may be selected from the group of anomalies consisting of a non-delta anomaly, a non-signature anomaly, a non-pattern anomaly, a non-visual anomaly, and a non-cavity anomaly.

A non-delta anomaly is one type of anomaly having a slope which is not indicative of a moisture anomaly. Slope may be measured as the delta of thermal or intensity value between two or more adjacent pixels. Non-delta anomalies may be indicated in the thermal image numerical value table by a pixel or cluster of pixels whose intensity value deviates from the intensity value of one or more adjacent pixels by between −5 and +5 intensity value units.

A non-signature anomaly is another type of anomaly having a slope which is not indicative of a moisture anomaly. Signature anomalies may be indicated by an intensity value slope which is not in the range of between 0.15 and 0.75 intensity value units. The slope is measured by comparing the intensity value of at least one pixel to at least one adjacent pixel(s) along either the X axis or the Y axis.

A non-pattern anomaly is another type of anomaly having a slope which is not indicative of a moisture anomaly. Non-pattern anomalies are indicative of an area which does not comprise the surface material, or comprises a material additional to the surface material. Such areas may comprise a coating or paint either on or below the surface material, and/or they may comprise a non-surface material laid on top of or underneath the surface material. Non-pattern anomalies may be indicated by a slope having a defined edge along the X axis and/or the Y axis between the intensity value of a first cluster of pixels and at least a second cluster of pixels. While moisture anomalies will typically have an amorphous shape without defined edges, a non-pattern anomaly will have a defined shape with defined edges.

A non-visual anomaly is another type of anomaly having a slope which is not indicative of a moisture anomaly. Non-visual anomalies are indicative of an object installed on the surface. For example, when the surface is a roof, the non-visual anomaly may be a rooftop mounted vent or HVAC unit. Visual anomalies may be detected by comparing the thermal image numerical value table to the visual image.

A non-cavity anomaly is another type of anomaly having a slope which is not indicative of a moisture anomaly. Non-cavity anomalies are areas in which the temperature influence of an object adjacent to a portion of the surface causes interference with the measured thermal value of a cluster of pixels corresponding to that portion of the surface. For example, when the surface is a roof of a building, and the building includes walls—a portion of which extend upward relative to gravity beyond the roof surface—heat may reflect off of the wall onto a portion of the roof surface adjacent to the wall causing an increased thermal value reading for the roof surface which is adjacent to the wall. Other objects may include a vent, an HVAC unit, or other physical configuration of the surface which extend upwardly from the surface or downwardly into the surface. Non-cavity anomalies may be indicated by an elevated thermal value of a pixel which is not amorphous and is located proximate to a physical configuration on or in the surface as shown in the infrared image and/or the visual image.

The first number ($n_1$) of first anomalies may be removed in any sequence. The sequence of removing the first number ($n_1$) of first anomalies is not believed important. In some embodiments, multiple types of first anomalies may be removed simultaneously. In other embodiments, all of the types of first anomalies may be removed simultaneously.

After removing the first number ($n_1$) of first anomalies, one may compare the first anomalies from the thermal image numerical analysis to the visual image. This comparison allows for visual confirmation of the first anomalies.

In some embodiments, after removing the first number ($n_1$) of first anomalies, one may identify a second number ($n_2$) of second anomalies from the thermal image numerical analysis. The second anomalies may be indicative of a moisture anomaly. Detection of a moisture anomaly may call for conducting any number of repair efforts on the specific targeted area(s) of the surface where the moisture anomaly has been detected. Such moisture anomalies may then be categorized as either an energy loss anomaly or a live load anomaly.

An energy loss anomaly is indicative of a reduction in the surface material's ability to resist heat flow—also known as thermal resistance. Thermal resistance of materials is commonly expressed as an R value, and may be calculated by a number of methods. One common method for calculating an R value of particular materials are typically published by the particular material manufacturer. Energy loss anomalies may be identified by first comparing a maximum thermal value loss indicative of 100% moisture content for the surface material to an observed thermal value loss of the surface material across each individual pixel of the plurality of pixels to obtain a moisture content level. The moisture content level may be calculated according to the following formula:

$$\frac{\Delta T_{Obs}}{\Delta T_{Max}} = MC$$

where $\Delta T_{obs}$ is the measured thermal value loss of the surface material, $\Delta T_{Max}$ is the maximum thermal value loss indicative of 100% moisture content for the surface material, and MC is the calculated moisture content level. The calculated moisture content level may then be compared to a known R value loss chart for the particular surface material to arrive at a percent R value reduction. Known R value loss charts exist for many different types of materials in many different industries. The percent R value reduction may be calculated according to the following formula:

$$\frac{MC}{RL} = \% \text{ Reduction}$$

where MC is the calculated moisture content level, and RL is the known R value loss of the particular surface material. The percent R value reduction may be calculated for an individual pixel, across the entire surface, or across one or more subsets of the surface. When the percent R value reduction is calculated across the entire surface, the $\Delta T_{Obs}$ will be the average of $\Delta T_{Obs}$ for each pixel of the plurality of pixels which make up the surface. When the percent R value reduction is calculated across one or more subsets of the surface, the $\Delta T_{Obs}$ will be the average of $\Delta T_{Obs}$ for each pixel which makes up the subset(s) of the surface. Detection of an energy loss anomaly may call for conducting any number of energy loss mitigation efforts on the specific targeted area(s) of the surface where the energy loss anomaly has been detected. Typically a percent R value reduction of at least 5% is indicative of an energy loss anomaly which requires mitigation efforts.

A live load anomaly is indicative of surface damage due to weight added to the surface after installation. Examples might include a person walking on the surface or snow accumulation sitting on the surface. Live load anomalies may be calculated by determining the square footage of an anomaly and multiplying the square footage by the thermal value delta from the nominal thermal value of each of the pixels corresponding to the anomaly. Detection of a live load anomaly may call for conducting any number of repair efforts on the specific targeted area(s) of the surface where the live load anomaly has been detected.

The method disclosed herein is an improvement over known methods for detecting and monitoring anomalies on the surface of a structure. By eliminating anomalies which are not of interest—such as delta anomalies, signature anomalies, pattern anomalies, visual anomalies, and cavity anomalies—repair and mitigation efforts can be focused on only those areas where anomalies of interest are located. For instance, instead of replacing an entire roof, the structure owner may be able to replace or repair only a certain section of a roof where an anomaly of interest, such as a moisture anomaly, has been detected. This may save the structure owner considerable time and monetary resources.

The method disclosed herein may be conducted on any number of types of surfaces. For instance, the surface may be a roof or wall of a building. In another example, the surface may be the top of a landfill. In yet another example the surface may be the deck of a bridge. In yet another example the surface may be a road, parking lot, or other paved surface. In still another example the surface may be an agricultural field.

Another type of surface anomaly may be a lighting anomaly. Lighting anomalies may include areas of non-existent or insufficient illumination at or near the surface during non-daylight hours. For many surfaces—such as the surface of a parking lot—these areas of non-existent or insufficient illumination can lead to dangerous events such as pedestrians slipping or falling, and criminal activities.

The method of detecting lighting anomalies on a surface of a structure may comprise a number of steps. A first step in such method may include taking a visual image of the surface of the structure. The visual image of the surface of the structure may be taken in color, greyscale, or black and white—but is preferably taken in color. The visual image is preferably taken by an optical camera mounted to an aircraft such as an airplane, helicopter, or drone flying over the surface. The optical camera preferably has a resolution of at least 4 megapixels with at least 15 megapixels being more preferred, and preferably has a shutter speed set in the range of between 1/400 seconds and 1/10000 second with between 1/450 and 1/9000 being more preferred and between 1/500 seconds and 1/8000 seconds being most preferred. When the aircraft is a helicopter or drone, the aircraft may be traveling at a speed in the range of between 0 mph (hovering still) and 10 mph with a speed in the range of between 1 mph and 7.5 mph being more preferred and between 2 mph and 5 mph being most preferred. When the aircraft is an airplane, the aircraft may be traveling at a speed in the range of between 75 mph and 150 mph with a speed in the range of 85 mph and 140 mph being more preferred and a speed in the range of between 100 mph and 125 mph being most preferred. Preferably the aircraft will be at an altitude of between 300 feet from the surface and 2,000 feet from the surface with between 350 feet from the surface and 1,750 feet from the surface being more preferred and between 400 feet from the surface and 1,500 feet from the surface being most preferred.

The visual image is preferably taken during a time of darkness. The time of darkness preferably occurs during the period no greater than 15 minutes after sunset and no less than 15 minutes before sunrise, with the period no greater than 30 minutes after sunset and no less than 30 minutes before sunrise being more preferred, the period no greater than 45 minutes after sunset and no less than 45 minutes before sunrise being still more preferred, and the period no greater than 60 minutes after sunset and no less than 60 minutes before sunrise being most preferred.

In some embodiments, the visual image may be taken at or around the same time as the thermal image. This thermal image may then be used as a comparison to determine if existing lighting elements at or near the surface are functioning properly by referring to the amount of heat emitted by lighting elements in known areas at or near the surface. A known lighting element which is not emitting heat as shown in the thermal image, or which is emitting less heat than other known lighting elements of the same or similar type, would indicate a lighting element which requires repair or replacement.

After taking the visual image of the surface of the structure, a black and white color adjustment may be conducted on the visual image. Black and white color adjustments are common and well known on many digital cameras and photo editing software programs used in a variety of industries. The black and white color adjustment changes each pixel which makes up the visual image of the surface from its specific color to black, white, or a shade of gray depending upon a number of factors including the specific color of the individual picture.

After performing the black and white color adjustment a light intensity of a plurality of pixels within the visual image is calculated in horizontal foot candles and/or vertical foot candles using known software applications such as Photo-Shop® or ImageJ which utilize the histogram feature to determine the mean light intensity value of the plurality of pixels within the visual image. Preferably the plurality of pixels upon which the light intensity calculation is conducted comprises 100% of the pixels within the visual image, however, in some embodiments the plurality of pixels may include up to 90% of the pixels within the visual image, up to 75% of the pixels within the visual image, up to 50% of the pixels within the visual image, up to 25% of the pixels within the visual image, or up to 10% of the pixels within the visual image.

Once the light intensity of the plurality of pixels within the visual image has been calculated, a first subset of the plurality of pixels may be identified. This first subset of the plurality of pixels corresponds to a threshold light intensity. Preferably, the threshold light intensity when measured in horizontal foot candles is in a range of between 0.75 fc and 3 fc with a range of between 1 fc and 2.75 fc being more preferred and a range of between 1.25 fc and 2.5 fc being most preferred. When measured in vertical foot candles, the threshold light intensity is preferably between 0.4 fc and 1.6 fc with a range of between 0.5 fc and 1.5 fc being more preferred and a range of between 0.6 fc and 1.4 fc being most preferred.

Once the threshold light intensity level has been determined, a second subset of the plurality of pixels may be identified. Each pixel within the second subset of the plurality of pixels will have a light intensity which is below the threshold light intensity. This second subset of the plurality of pixels may then be subjected to a black color adjustment. A black color adjustment indicates that the color of each pixel within the second subset of pixels is changed to black from its previously existing color. The black color adjustment sets each pixel within the second subset of the plurality of pixels to a first color value that is no more than 15% above black (Color code RGBA=#0.0,0.0,0.0; Hue:0, Saturation:0, and Value:0.0) with no more than 10% above black being more preferred and no more than 5% above black being most preferred.

Next, a third subset of the plurality of pixels may be identified. Each pixel within the third subset of the plurality of pixels will have a light intensity which is above the threshold light intensity. This third subset of the plurality of pixels may then be subjected to a gradation color adjustment. A gradation color adjustment indicates that the color of each pixel within the third subset of pixels is changed from its previously existing color with pixels having a higher light intensity being changed to white or lighter shades of gray and pixels having lower light intensity (but still above the threshold light intensity) being changed to darker shades of gray. Preferably the pixels corresponding to the highest light intensity value are set to a second color value that is no more than 15% below white (Color code RGBA=#255,255,255; Hue:0, Saturation:0, and Value:100) with no more than 10% below white being more preferred and no more than 5% below white being most preferred. Pixels between the threshold light intensity value and the highest light intensity value are set to a color value that is between the first color value of the second subset of the plurality of pixels and the second color value of the pixels corresponding to the highest light intensity value. The color value for such pixels will vary with pixels having higher light intensity values being set to a color value which is closer to the second color value and pixels having lower light intensity values being set to a color value which is closer to the first color value.

The final image after the black color adjustment and gradation color adjustment may be utilized to identify areas of non-existent or insufficient illumination which may call for remediation efforts such as the addition of new lighting elements or the adjustment of existing lighting elements. For instance, areas of the surface corresponding to the second subset of the plurality of pixels which have been subjected to a black color adjustment would call for remediation efforts. In some embodiments, areas of the surface corresponding to the third subset of the plurality of pixels which have been adjusted to have darker shades of gray by the gradation color adjustment may also call for remediation efforts.

The final image may be validated by way of a digital light meter operated at surface level to take spot readings from within the boundaries of the visual image. One preferred digital light meter is an IDEAL Electrical 61-686 Digital Light Meter available from Ideal Industries (Canada) Corp. of Ontario, Canada.

One or more of the method steps disclosed herein may be conducted via a computer. Method steps which may be conducted via a computer include—but are not limited to—obtaining a thermal image numerical value table, obtaining a surface nominal thermal value, eliminating a first subset of pixels from the plurality of pixels, comparing a thermal value of each pixel of the plurality of pixels not in the first subset of pixels to the surface nominal thermal value, removing a first number of first anomalies from the thermal image numerical value table, comparing the thermal value of a second number of second anomalies from the thermal image numerical value table, comparing the first anomalies from the thermal image numerical analysis to the visual image, calculating the intensity value, performing a black and white color adjustment, calculating a lighting intensity, identifying a first subset of the plurality of pixels, identifying a second subset of the plurality of pixels, performing a black color adjustment, identifying a third subset of the plurality of pixels, and performing a gradation color adjustment.

The invention claimed is:

1. A method of detecting anomalies on a surface comprising: taking a thermal image of the surface, conducting a thermal image numerical analysis on the thermal image wherein the thermal image numerical analysis comprises:
   i. obtaining a thermal image numerical value table comprising a plurality of pixels with each pixel having an X coordinate, a Y coordinate, and a Z coordinate with the X coordinate and the Y coordinate corresponding to a specific spatial location of the pixel on the surface, and the Z coordinate corresponding to a thermal value of said pixel which is a real number greater than or equal to 0;
   ii. obtaining a surface nominal thermal value;
   iii. eliminating a first subset of pixels from the plurality of pixels wherein each of the first subset of pixels has a thermal value which is within a nominal thermal variation of a surface material of the surface to the surface nominal thermal value;
   iv. comparing a thermal value of each pixel of the plurality of pixels not in the first subset of pixels to the surface nominal thermal value to identify at least one anomaly;
   v. comparing the thermal value of a second number (n2) of a second anomalies from the thermal image numerical value table wherein n2 is an integer greater than or equal to 0 to the surface nominal thermal value in order to identify a type of anomaly selected from the group consisting of an energy loss anomaly, and a live load anomaly, and
   vi. removing a first number (ni) of first anomalies from the thermal image numerical value table wherein ni is an integer greater than or equal to 0, and the first anomalies are selected from the group consisting of at least one non-delta anomaly, at least one non-signature anomaly, at least one non-pattern anomaly, at least one non-visual anomaly, and at least one non-cavity anomaly.

2. The method of claim 1, wherein the thermal image is taken at least 60 minutes after sunset on a sunny day.

3. The method of claim 2, wherein the thermal image is taken at a time selected from the group consisting of no more than about 6 hours after sunset, no more than about 5 hours after sunset, no more than about 4 hours sunset, no more than about 3 hours after sunset, and no more than about 2 hours after sunset.

4. The method of claim 2, wherein the thermal image is taken on a day in which a geographic location of the surface experiences no more than about 40% cloud cover during at least the 4 hour preceding sunset.

5. The method of claim 2, wherein the thermal image is taken on a day in which a geographic location of the surface experiences no more than about 30% cloud cover during at least the 4 hour preceding sunset.

6. The method of claim 2, wherein the thermal image is taken on a day in which a geographic location of the surface experiences no more than about 20% cloud cover during at least the 4 hour preceding sunset.

7. The method of claim 2, wherein the thermal image is taken on a day in which a geographic location of the surface experiences no more than about 10% cloud cover during at least the 4 hour preceding sunset.

8. The method of claim 1, further comprising: taking a visual image of the surface; and comparing the first anomalies from the thermal image numerical analysis to the visual image.

9. The method of claim 8, wherein the visual image is taken at or around solar noon on the same day as the thermal image.

10. The method of claim 1, wherein obtaining the surface nominal thermal value comprises calculating the most prevalent thermal value across a second subset of the pixels.

11. The method of claim 10, wherein the second subset of the plurality of pixels comprises a percentage of total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

12. The method of claim 1, wherein the step of comparing a thermal value of each pixel of the plurality of pixels to the surface nominal thermal value yields an intensity value for each thermal value corresponding to each individual pixel calculated according to a formula:

$$(MTV)-(NTV)=IV$$

where MTV is the thermal value of each pixel and NTV is the surface nominal thermal value.

13. The method of claim 12, wherein the intensity value is calculated for each pixel of the plurality of pixels which make up the thermal image numerical value table.

14. The method of claim 12, wherein the intensity value is calculated for a third subset of the plurality of pixels comprising a percentage of the total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

15. The method of claim 12, wherein the intensity value of each pixel of the plurality of pixels is plotted on a three dimensional graph.

16. The method of claim 1, wherein obtaining the surface nominal thermal value comprises calculating the most prevalent thermal value across a second subset of the pixels.

17. The method of claim 16, wherein the second subset of the plurality of pixels comprises a percentage of total pixels of the thermal image selected from the group consisting of at least 20% of the total pixels, at least 35% of the total pixels, at least 50% of the total pixels, at least 65% of the total pixels, at least 90% of the total pixels, at least 99% of the total pixels, and 100% of the total pixels.

18. The method of claim 1, wherein the step of comparing a thermal value of each pixel of the plurality of pixels to the surface nominal thermal value yields an intensity value for each thermal value corresponding to each individual pixel calculated according to a formula:

$$(MTV)-(NTV)=IV$$

where MTV is the thermal value of each pixel and NTV is the surface nominal thermal value.

19. The method of claim 18, wherein the intensity value is calculated for each pixel of the plurality of pixels which make up the thermal image numerical value table.

\* \* \* \* \*

UNITED STATES PATENT AND TRADEMARK OFFICE
CERTIFICATE OF CORRECTION

| | | |
|---|---|---|
| PATENT NO. | : 11,816,828 B2 | Page 1 of 1 |
| APPLICATION NO. | : 18/170325 | |
| DATED | : November 14, 2023 | |
| INVENTOR(S) | : Joseph C. Cobb | |

It is certified that error appears in the above-identified patent and that said Letters Patent is hereby corrected as shown below:

In the Claims

In Claim 1 at Column 13, Line 48, delete "(ni)" and insert -- (n1) --

In Claim 1 at Column 13, Line 49, delete "ni" and insert -- n1 --

Signed and Sealed this
Ninth Day of January, 2024

*Katherine Kelly Vidal*

Katherine Kelly Vidal
*Director of the United States Patent and Trademark Office*